United States Patent [19]

Alten et al.

[11] Patent Number: 5,183,270
[45] Date of Patent: Feb. 2, 1993

[54] COMPOSITE SEAL ROTOR

[75] Inventors: Charles J. Alten, Scottsdale; John S. Cuccio, Jr., Chandler; Harry L. Kington, Scottsdale; James D. Fontana, Phoenix, all of Ariz.

[73] Assignee: Allied-Signal Inc., Morris Township, Morris County, N.J.

[21] Appl. No.: 760,419

[22] Filed: Sep. 16, 1991

[51] Int. Cl.$^5$ .............................................. F16J 15/34
[52] U.S. Cl. ..................... 277/81 R; 277/84; 277/85; 277/96.1; 277/96.2
[58] Field of Search ................. 277/81 R, 84, 85, 87, 277/94, 96, 96.1, 96.2

[56] References Cited

U.S. PATENT DOCUMENTS

| | | | |
|---|---|---|---|
| 2,583,671 | 1/1952 | Schmitter | 277/81 R X |
| 2,628,852 | 2/1953 | Voytech | 277/81 R X |
| 2,814,511 | 11/1957 | Truax | 277/81 R X |
| 2,937,039 | 5/1960 | Santapa | 277/81 R X |
| 2,990,202 | 6/1961 | Dennison | 277/96 X |
| 2,992,842 | 7/1961 | Shevchenko et al. | 277/81 R X |
| 3,652,183 | 3/1972 | Pottharst, Jr. | 277/96.2 X |
| 3,770,181 | 11/1973 | Stahl . | |
| 3,926,443 | 12/1975 | Fenerty et al. . | |
| 4,036,505 | 7/1977 | Floyd et al. . | |
| 4,103,907 | 8/1978 | Inouye et al. | 277/96.1 |
| 4,174,844 | 11/1979 | Zobens . | |
| 4,196,912 | 4/1980 | Quitberg . | |
| 4,212,473 | 7/1980 | Arai . | |
| 4,243,233 | 1/1981 | Arai . | |
| 4,323,255 | 4/1982 | Wiese . | |
| 4,336,944 | 6/1982 | Blair . | |
| 4,415,165 | 11/1983 | Martini . | |
| 4,759,554 | 7/1988 | Kemp et al. . | |
| 4,973,065 | 11/1990 | Habich | 277/85 X |

Primary Examiner—William A. Cuchlinski, Jr.
Assistant Examiner—Scott W. Cummings
Attorney, Agent, or Firm—Jerry J. Holden; James W. McFarland; Robert A. Walsh

[57] ABSTRACT

A composite seal rotor is provided for sealing between the rotating components of a gas turbine engine held together by the compressive force of a lockup assembly and a housing circumscribing the rotating components and having carbon face seals mounted thereto. The seal rotor is comprised of a metal base portion disposed between two of said rotating components for transmitting said compressive force therethrough, and a ceramic surface for sealingly engaging said carbon face seal.

7 Claims, 2 Drawing Sheets

COMPOSITE SEAL ROTOR

TECHNICAL FIELD

This invention relates generally to face seal assemblies comprised of a rotating seal rotor and a stationary face seal for sealing along the rotating shaft of a gas turbine engine, and in particular, to an improved ceramic seal rotor or composite seal rotor having a metal portion and a ceramic portion.

BACKGROUND OF THE INVENTION

Face seal assemblies are employed in gas turbine engines to prevent leakage of fluid along the engine's rotating shaft where the shaft extends through a wall or partition. These assemblies are comprised of a rotating component called a seal rotor and a non-rotating component called a face seal. The face seal is usually lightly spring loaded against the seal rotor.

Historically, various materials have been used for both the seal rotor and the face seal. For example, metals, carbon, ceramics, and other materials are mentioned in Zobens, U.S. Pat. No. 4,174,844, Floyd et al., U.S. Pat. No. 4,036,505, Fenerty et al., U.S. Pat. No. 3,926,443, and Stahl, U.S. Pat. No. 3,770,181. A common configuration is to have a metallic seal rotor and a carbon face seal. A problem with these seals is that oil coking results from the friction between the seal rotor and the face seal. Also, the carbon face seal tends to wear which requires that the engine be removed from service regularly to either inspect or replace the seal.

It is well known by those skilled in the art, that a carbon face seal will wear at a lower rate when rubbing against a ceramic surface as opposed to a metallic surface. Accordingly, one proposal for increasing the life of a conventional face seal assembly is to replace the metallic seal rotor with a ceramic seal rotor, (see for example Fenerty et al., teaching a seal assembly for a water pump in which one of the seal rings is ceramic, column 1, lines 50–55). However, such technology is not applicable to gas turbine engines because the rotating components in these engines are assembled in a lockup. This means that the rotating components, (the compressor disks and turbine disks including the seal rotors) are first stacked one atop the other and then forced, and held together by a large compressive force. This compressive force produces concentrated tensile stresses on the sealing surfaces of the seal rotors abutting a rotating component. Because of its brittle nature conventional ceramic seal rotors tend to crack under this compressive force.

Accordingly, a need still exists for a face seal assembly, for a gas turbine engine, having a seal rotor that can withstand the compressive force of a lockup assembly and also provides a ceramic surface for sealingly engaging a carbon face seal.

SUMMARY OF THE INVENTION

An object of the present invention is to provide a face seal assembly for a gas turbine engine, comprising a carbon face seal and a seal rotor that has a ceramic surface for sealingly engaging the carbon face seal, and a base portion that can withstand the compressive forces of a lockup assembly.

In a first embodiment, the present invention achieves the above-stated object by providing a face seal assembly that has a ceramic rotor seal and a spring member for reducing the compressive force transmitted to the base of the seal rotor. In a second embodiment, the seal assembly includes a composite seal rotor. The composite seal rotor has an inner metal ring, for transmitting compressive forces, and an outer ceramic ring for sealingly engaging the carbon face seal.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
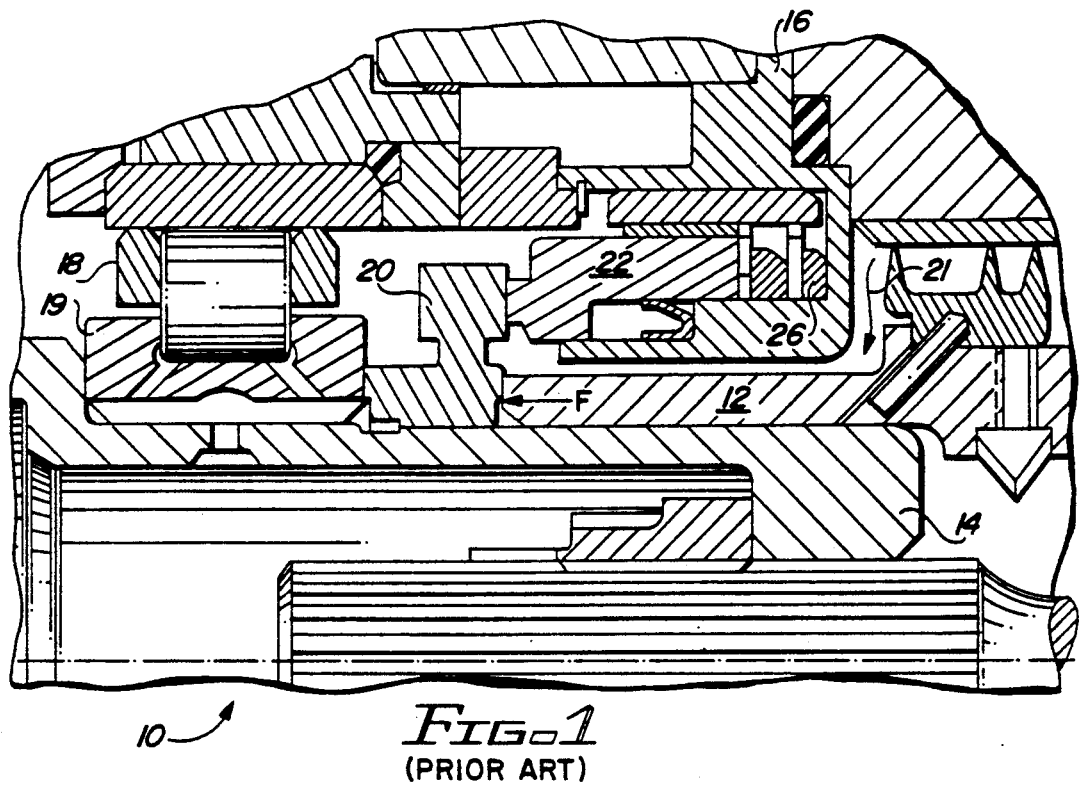
FIG. 1 is a cross-sectional view of a portion of a gas turbine engine having a conventional face seal assembly.

Referring to the drawings, FIG. 1 shows a compressor section of a gas turbine engine generally denoted by the reference numeral 10. The section 10 has a rotating compressor disk 12 coupled to a rotating shaft 14. Circumscribing the shaft 14 is a stationary housing 16. The housing 16 is mounted atop a bearing 18 having an inner race 19 which is mounted on the shaft 14. A metallic seal rotor 20 is mounted for rotation on the shaft 14 and has a base portion that abuts at one axial end with the inner race 19 and at the other axial end with the compressor disk 12. A portion of the housing 16 circumscribes a portion of the compressor disk 12 defining a leakage path, (referenced by arrow 21) therebetween. Mounted within the housing 16 is a nonrotating carbon face seal 22 that is positioned to abut an upper portion of the seal rotor 20 sealing the leakage path 21. A spring 26 forces the face seal 22 into sealing engagement with the upper portion of the rotor seal 20. Because of the lockup assembly of the engine containing the compressor section 10, a compressive force, represented by arrow F, of about 30,000 lbs, is transmitted from the compressor disk 12, through the base portion of the seal rotor 20, to the inner race 19.

Figure 2:
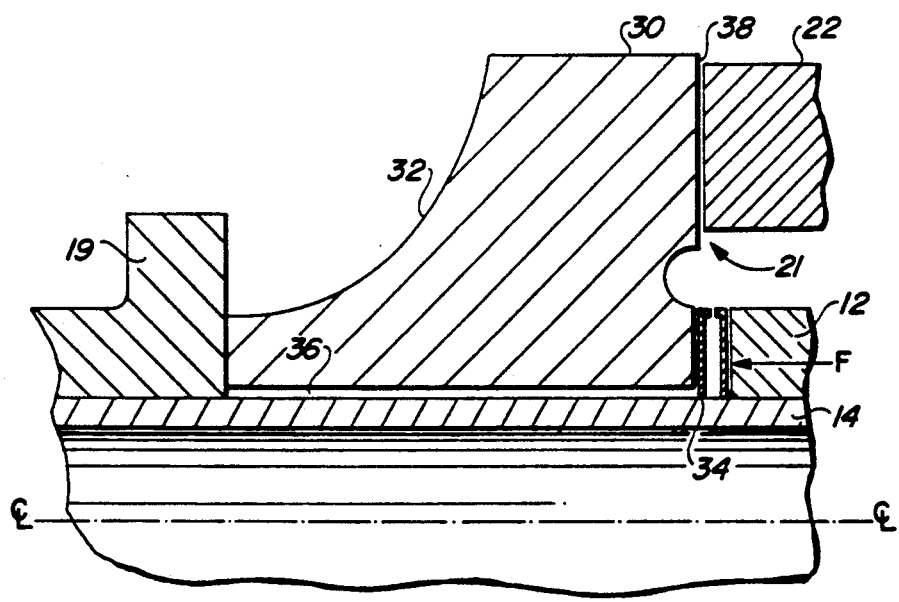
FIG. 2 is a cross-sectional view of a face seal assembly having the ceramic seal rotor contemplated by the present invention.

In one embodiment of the present invention, shown in FIG. 2, a single piece, seal rotor 30 is made of a ring of ceramic material such as silicon carbide. The base portion of the seal rotor 30 is mounted and held between the inner race 19 and the compressor disk 12 so as to maintain a gap 36 between the seal rotor 30 and the shaft 14 and to place an axial face portion 38 into sealing engagement with the carbon face seal 22. The gap 36 permits the shaft 14 to thermally expand without coming into contact with the rotor seal 30. A spring 34 is mounted on the shaft 14 and is preferably disposed between the compressor disk 12 and the base of the seal rotor 30 so as to reduce the compressive force F transmitted to the seal 30. Alternately, the spring 34 can be disposed anywhere upstream of the seal 30 so long as it is in the load path of the compressive force F. Importantly, the backside 32 of the seal rotor 30 is configured for maximum surface area and hence maximum heat transfer. Also, it is preferable that the backside 32 receives cooling oil splashed from the interior of the bearing 18.

Figure 3:
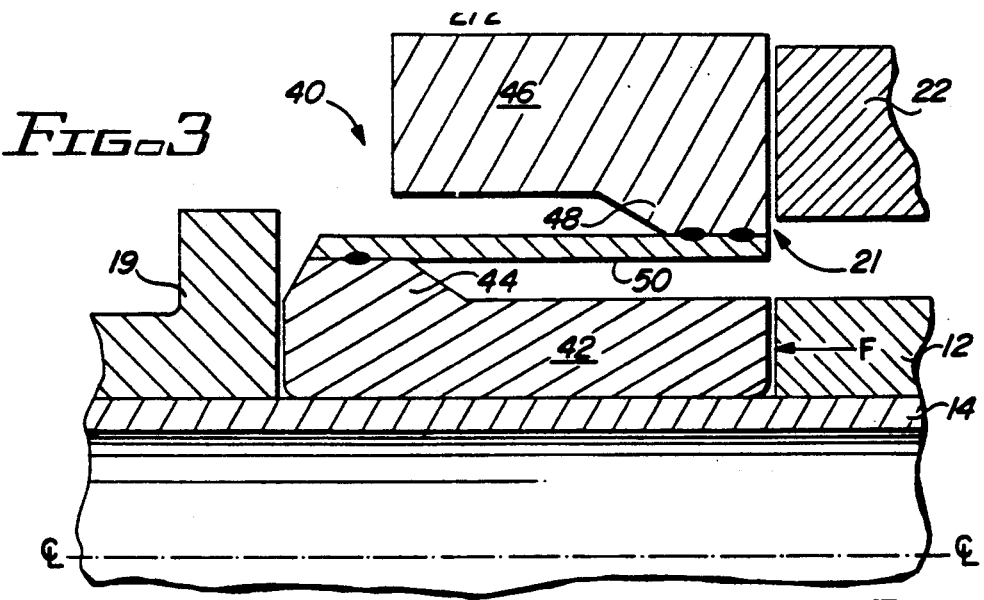
FIG. 3 is a cross-sectional view of a face seal assembly having the composite seal rotor contemplated by the present invention.

FIG. 3, depicts a composite rotor seal 40 which includes a metal ring 42 and a ceramic ring 46 made, for example, from silicon carbide. The metal ring 42 is press fit between the compressor shaft 12 and the inner race 19, and has a lip 44 circumscribing its outer surface at an axial end adjacent the inner race 19. The ceramic ring 46 sealingly abuts the carbon seal 22 and also has a lip 48 circumscribing its inner surface at an axial end opposite the lip 44. A metal cylindrical member 50 is disposed between the metal ring 42 and the ceramic ring 46 so that a portion of its inner surface is welded or brazed to the lip 44 and a portion of its outer surface is welded or brazed to the lip 48, thereby sealing the leakage path 21. Alternatively, the member 50 is interference fit between the rings 42 and 46.

Figure 4:
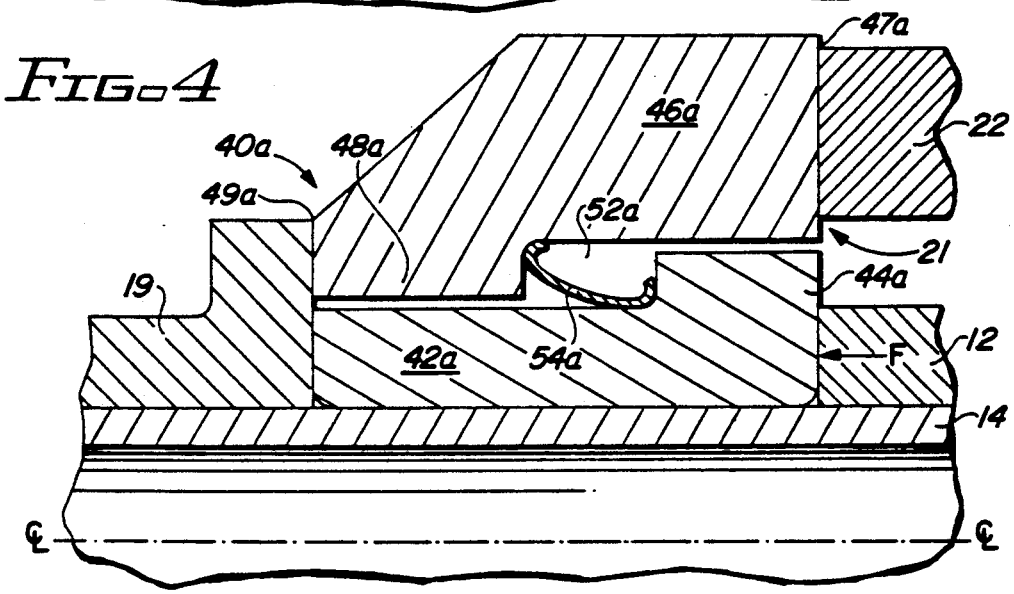
FIG. 4 is a cross-sectional view of an alternate embodiment of the composite seal rotor of FIG. 3.
Figure 5:
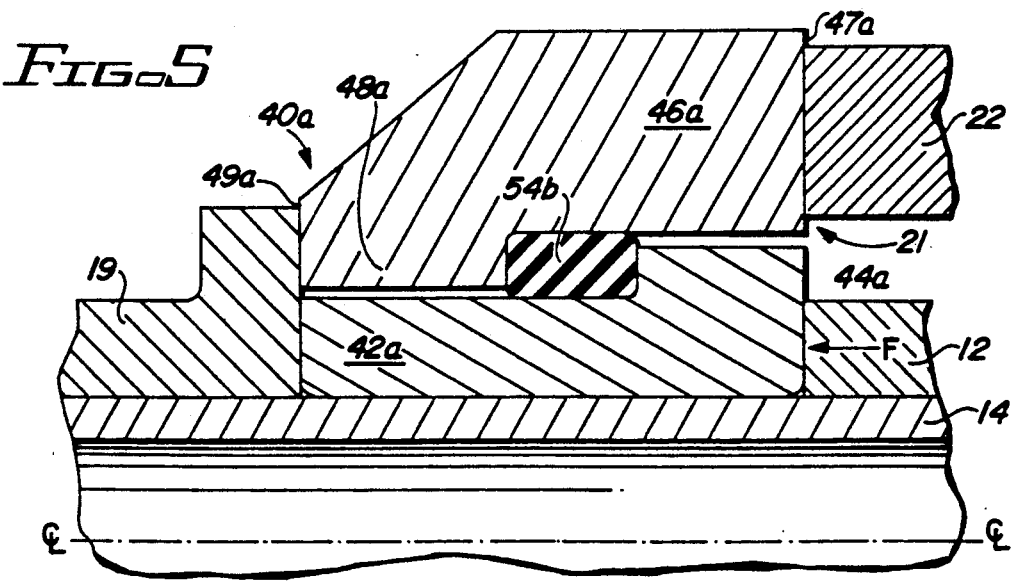
FIG. 5 is a cross-sectional view of another alternate embodiment of the composite seal rotor of FIG. 3.

In an alternative embodiment, see FIG. 4, a composite rotor seal 40a includes a metal ring 42a and a ceramic ring 46a. The metal ring 42a is mounted for rotation on the shaft 14 and axially clamped between the compressor shaft 12 and the inner race 19. The ring 42a has a lip 44a circumscribing its outer surface at an axial end adjacent the compressor shaft 12. The ceramic ring 46a has a first axial face portion 47a which sealingly engages the carbon seal 22 and a second axial face portion 49a for abutting an axial surface of the inner race 19 and thereby correctly positioning the ring 46a. The ring 46a also has a lip 48a circumscribing its inner surface at an axial end opposite the lip 44a. The lips 44a and 48a are configured so that when the ceramic ring 46a is mounted about the metal ring 42a an annular chamber 52a is defined therebetween. An annular, piloting spring 54a is disposed within the chamber 52a to keep the relative position of the rings 42a and 46a fixed and to maintain a gap 36a that allows for the thermal expansion of the metal ring 42a. Alternatively, as shown in FIG. 5, an elastomeric, piloting ring 54b can be used in place of piloting spring 54a.

Importantly, in each of these embodiments the ceramic ring 46,46a is not exposed to the compressive force generated by the lockup assembly, and the metal ring 42,42a does not contact the carbon seal 22.

Thus, a face seal assembly for a gas turbine engine, comprising a carbon face seal and a seal rotor is provided. The seal rotor has a ceramic surface for sealingly engaging the carbon face seal, and a base portion that can withstand the compressive forces of a lockup assembly.

Various modifications and alterations to the above described rotor seal will be apparent to those skilled in the art. Accordingly, the foregoing detailed description of the preferred embodiment of the invention should be considered exemplary in nature and not a limiting to the scope and spirit of the invention as set forth in the following claims.

What is claimed is:

1. A seal rotor for sealing between rotating components of a gas turbine engine mounted on a rotating shaft and a housing circumscribing said rotating components and shaft, wherein said rotating components are held together by the compressive force generated by a lockup assembly and said housing has a stationary carbon face seal mounted thereto, said seal rotor comprising:
   a metal ring mounted for rotation to said rotating shaft and disposed intermediate two of said rotating components for transmitting said compressive force therebetween;
   a ceramic ring radially spaced apart and circumscribing said metal ring and having an axial face for sealingly engaging an axial face of said carbon face seal; and
   a metal cylindrical member radially disposed between said metal ring and said ceramic ring, said cylindrical member attached along a portion of its inner surface to said metal ring and attached along a portion of its outer surface to said ceramic ring.

2. The seal rotor of claim 1 wherein said cylindrical member is welded to said metal ring and to said ceramic ring.

3. The seal rotor of claim 2 wherein said cylindrical member is brazed to said metal ring and to said ceramic ring.

4. The seal rotor of claim 2 wherein said metal ring has a lip circumscribing its outer surface at a first axial end and said ceramic ring has a lip circumscribing its inner surface at an axial end opposite said first axial end, said inner surface portion of said metal cylindrical member being attached to said lip of said metal ring, and said outer surface portion of said metal cylindrical member being attached to said lip of said ceramic ring.

5. A seal rotor for sealing between rotating components of a gas turbine engine mounted on a rotating shaft and a housing circumscribing said rotating components and shaft, wherein said rotating components are held together by the compressive force generated by a lockup assembly and said housing has a stationary carbon face seal mounted thereto, said seal rotor comprising:
   a metal ring mounted for rotation to said rotating shaft and disposed intermediate two of said rotating components for transmitting said compressive force therebetween, said metal ring having a lip circumscribing its outer surface at a first axial end;
   a ceramic ring radially spaced apart and circumscribing said metal ring having a first axial face sealingly engaging an axial face of said carbon face seal and a second axial face opposite said first axial face abutting an axial surface of one of said rotating components, said ceramic ring having a lip circumscribing its inner surface at an axial end opposite the lip of said metal ring, said opposed lips defining an annular chamber between said metal ring and said ceramic ring; and
   an annular, piloting member disposed in said chamber to maintain both the relative position of said rings and a gap between said rings that allows for the thermal expansion of said metal ring.

6. The seal rotor of claim 5 wherein said piloting member is a spring.

7. The seal rotor of claim 5 wherein said piloting member is an elastomeric ring.

* * * * *